Jan. 5, 1965

W. A. HUNT 3,164,104

TRANSPORTER MEANS

Filed July 2, 1962

Inventor
William Allen Hunt
by Albert D. Jackus
Attorney

Fig. 2.

Inventor
William Allen Hunt
by Albert J. Jacobs
Attorney

Jan. 5, 1965 W. A. HUNT 3,164,104
TRANSPORTER MEANS
Filed July 2, 1962 7 Sheets-Sheet 4

Inventor
William Allen Hunt
by Albert D. Jackes
Attorney

United States Patent Office 3,164,104
Patented Jan. 5, 1965

3,164,104
TRANSPORTER MEANS
William Allen Hunt, Northumberland, England, assignor to Joseph Cook, Sons & Company (1930) Limited, Washington, England, a company of Great Britain and Northern Ireland
Filed July 2, 1962, Ser. No. 206,600
Claims priority, application Great Britain July 4, 1961
13 Claims. (Cl. 104—166)

This invention provides novel propelling means for the transportation of suspended carriages for personnel or material, including transportation over difficult ground, and more particularly through tunnels or galleries for example in mines, which galleries or tunnels follow a path curving laterally and/or upwardly and downwardly.

Transporter means according to the invention are adapted for displacement upon known means which comprises a continuous series of rotatable cylindrical elements connected together by universal joints, drive means for rotating said series of elements, disposed at spaced intervals and a travelling rider comprising at least two spaced sets of freely rotatable means mounted so that each set bears upon the upper arcs of said cylindrical elements, said bearing means being pivotally mounted for turning about axes radial to the axis of said cylindrical elements and connected together in parallel disposition so as to be angularly displaceable between attitudes wherein the axes of said rotatable means are oblique to the cylindrical element on which the rotatable means bear (when a longitudinal driving effort is transmitted to the rider by friction between the cylindrical element and said rotatable means) and attitudes wherein the axes of said rotatable means are parallel to that of the cylindrical element (when no driving effort is transmitted).

In such transporter means wherein the travelling rider, which is adapted to traverse upward or downward gradients, comprises, for use upon a series of rotatable cylindrical elements as aforesaid, a frame comprising two oblique wing members adapted to extend symmetrically over said elements, at least four clevis members angularly displaceable about shanks mounted in two transverse pair and two in each of said wing members, and four rollers freely rotatable one in each of said clevis members, the axes of said shanks diverging upwardly so that the rollers bear in two longitudinally spaced pairs on opposite sides of the upper arcs of said cylindrical elements, and means interconnecting said shanks so that the rollers are jointly displaceable between attitudes oblique to the cylindrical element on which they bear and attitudes parallel to said element.

For enhancing the transmission of a longitudinal driving effort when the rider is traversing cylindrical elements inclined to conform to gradients, the frame of the rider may have mounted upon it, on a transverse axis, at least one horizontal roller resiliently urged upward to engage a fixed track located above said cylindrical elements in such manner that the rider is caused to bear more heavily upon said elements. Alternatively, the rider may have mounted on it at least one other roller, adapted to be displaceable between oblique and parallel attitudes as aforesaid, and located to bear upward resiliently upon the lower arcs of said cylindrical driving elements.

In order that the invention as above stated, and further features thereof, may be better understood, various embodiments and modifications will be described, by way of example, with reference to the accompanying drawings, wherein.

Figure 1:
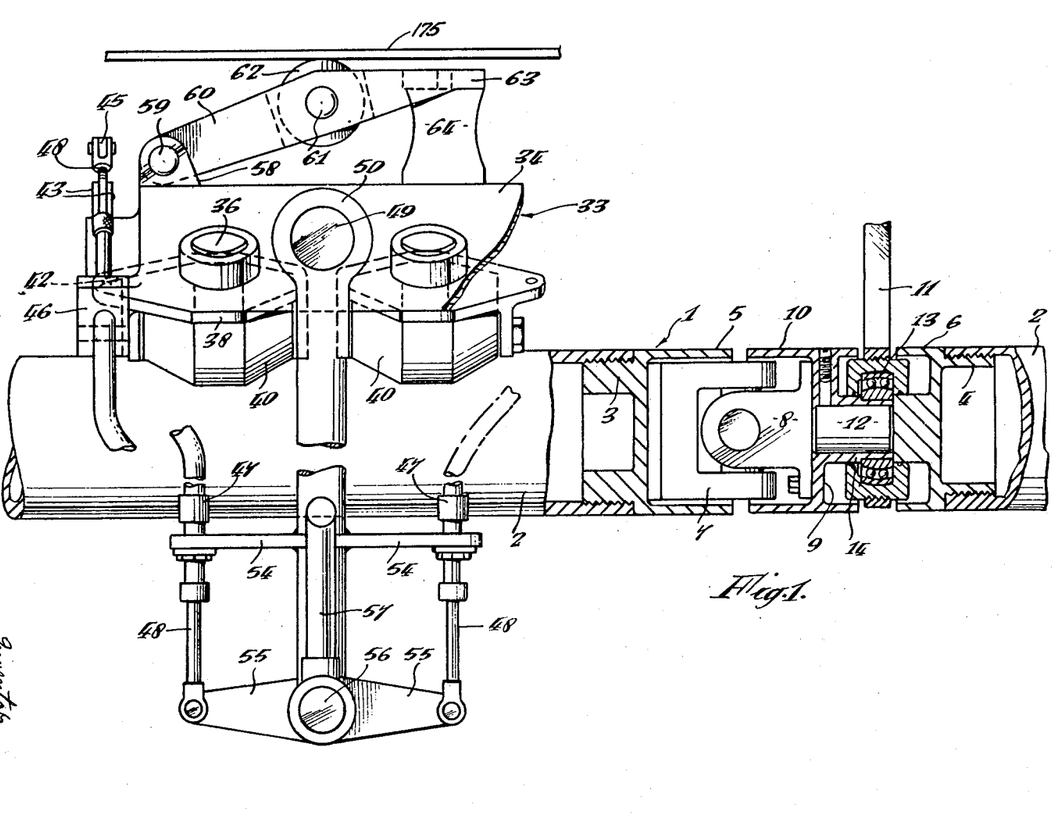
FIG. 1 is a side elevation of one embodiment of a rider, mounted on a cylindrical element, and showing in section a supported joint between the ends of two such elements.
Figure 2:
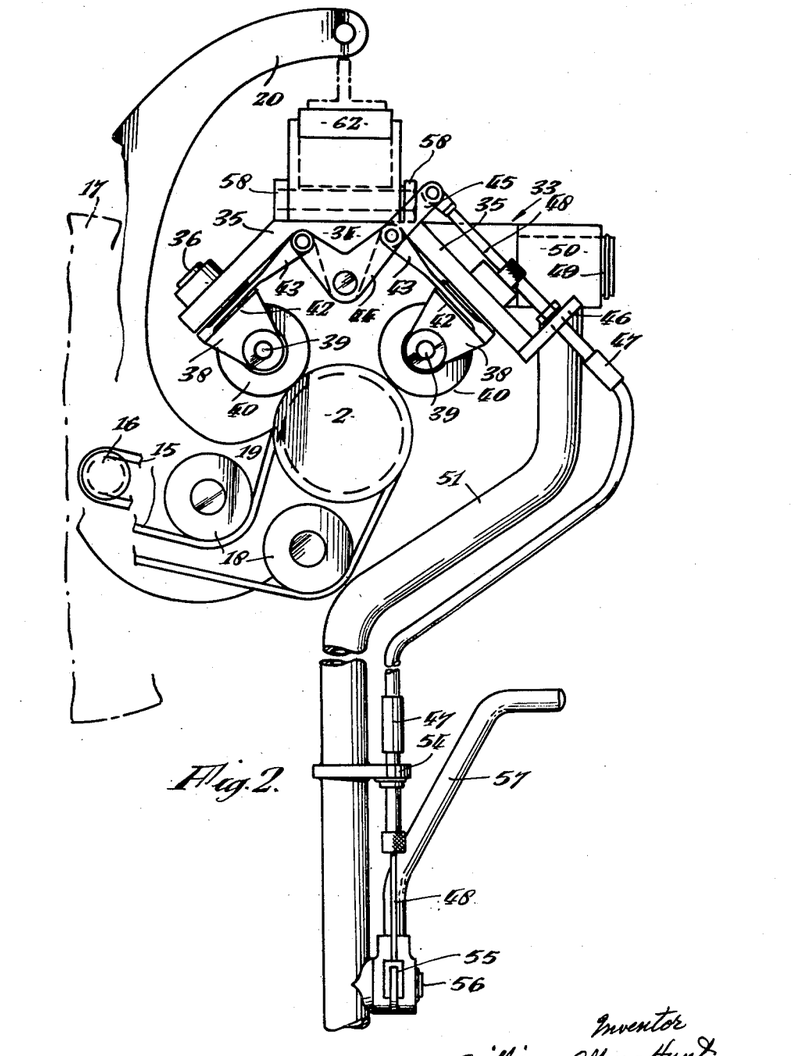
FIG. 2 is a corresponding end elevation, further showing a supporting bracket for said joint and drive means for rotating said cylindrical elements.

Referring first to FIGS. 1 and 2, the series of cylindrical driving elements 1 comprises a plurality of lengths of rigid tubing 2 of about 3½/4" diameter, each length being up to about 20 ft. long, or shorter if required for locating the series around a curve of relatively small radius. The ends of each tube 2 have screwed into them members 3, 4 each having a cylindrical skirt 5, 6 of the same diameter of the tube. Within said skirt 5 there is located one element 7 of a Hooke's joint. The other element 8 of said Hooke's joint is mounted within the rim 10 of a cylindrical pulley-like element 9 the arrangement being such that the adjacent edges of said rim 10 and said skirt 5 are close enough together to provide a substantially continuous cylindrical surface, while permitting a degree of angular displacement between the element 9 and the tube end to which said skirt 5 is secured. The pulley-like element 9 is mounted, on one side of a supporting bracket 11, upon the end of a spindle 12 secured in the member 4 and freely rotatable in said bracket, the spindle preferably being supported by a fully enclosed, self-aligning and self-lubricating anti-friction bearing 13. The series of cylindrical elements thus interconnected and supported may be extended throughout the length of the track or gallery to be traversed, the curves in said track or gallery, whether lateral or upward or downward, being followed by reason of the universal joints provided at each bracket where the series of elements is supported.

Said series of elements may be continuously rotatable by driving means applied to the pulley-like elements 9, located at some of said brackets 11. For example, as shown in FIG. 2, the rims 10 of these spaced driving pulleys may have their radii reduced by the thickness of a driving belt 15, so as to maintain over the belt the radius of the tubes 2. The driving belt embracing said pulley 9, and extending around a driving pulley 16 on the shaft of an adjacently supported electric motor 17, is guided by two idler pulleys 18 so as to leave the upper arc of the assembly of cylindrical elements unobstructed. For example, the idler pulleys 18 may be located as shown that both runs of the belt, moving towards and away from the driven pulley, are located below the horizontal diameter of the pulley. A plurality of such driving means are located at suitable intervals along the length of the series of cylindrical elements, and the electric motors of said driving means may be synchronous motors for ensuring uniform driving speed.

In an arrangement of the cylindrical elements as above described for transportation of suspended carriages, the brackets 11 may be C-shaped as shown, the pulley spindles being mounted in the lower and upwardly directed ends 19 of the brackets, and the upper parts 20 of said brackets being pivotally suspended by suitable anchorages from the roof of a mine gallery.

Figures 3, 4, 5:
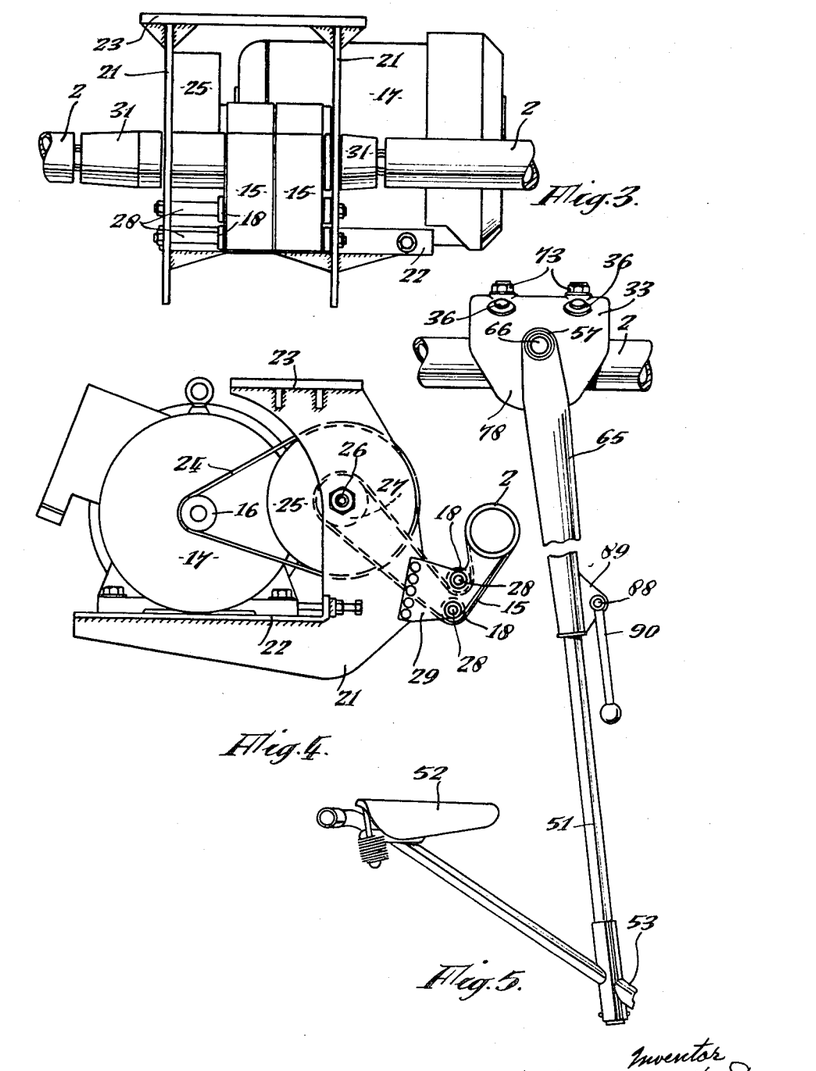
FIGS. 3 and 4 are respectively side and end elevations of alternative drive means for said cylindrical elements.
FIG. 5 is a side elevation of another embodiment of a transporter adapted as a man-carrier.
Figures 6, 8:
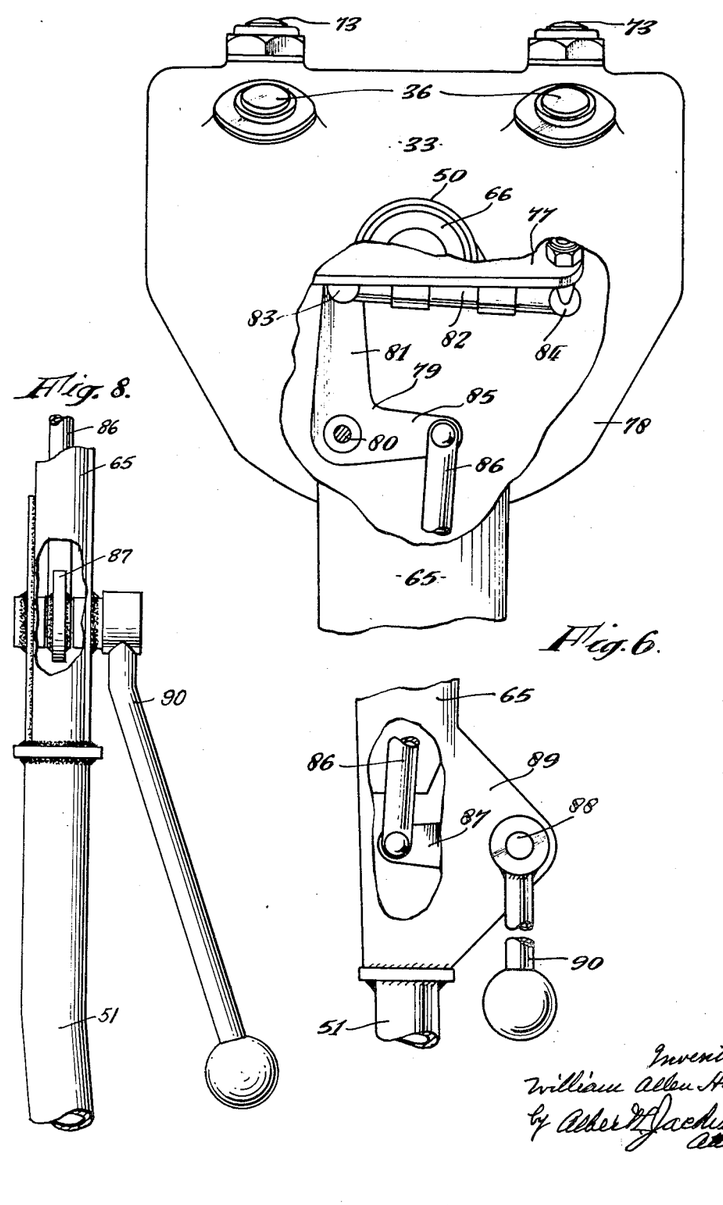
FIG. 6 is a fragmentary side elevation, partly broken away and on a larger scale, of upper and intermediate parts of said transporter.
FIGS. 7 and 8 are end elevations, partly in section, of said upper and intermediate parts.

In the alternative arrangement of driving means shown in FIGS. 3 and 4, a driving motor 17 is adjustably mounted on a plate 22 caried by and connecting a pair of brackets 21 which are rigidly welded beneath a roof plate 23. The motor pulley 16 drives by a belt 24 a pulley 25 on a layshaft 26 mounted in the brackets 21, and two smaller pulleys 27 on said layshaft drive belts 15 which rotate the cylindrical elements 2, the belts 15 being guided by idler pulleys 18 mounted on spindles 28 mounted in lugs 29, secured to said brackets 21, which also support the assembly of cylindrical elements in the manner described above. As shown in FIG. 3, adjacent the brackets 21 each end of a tube 2 is connected by a universal joint 30 with a slightly tapering element 31 which extends to the outside of the bracket, and between the pair of brackets the two driven pulleys have a radius equal to or somewhat larger than that of the tubes 2, so that the radius over the belts 15 is equal to the radius of the larger ends of said elements 31 and a spacer element 32 within the brackets.

As shown in FIGS. 1 and 2, the travelling rider 33 comprises a strong, rigid frame 34 having two downwardly oblique lateral wing plates 35 which are mutually perpendicular. In each of these plates there are two bushes for the shanks 36 of a pair of depending clevis members 37, 38, each of which supports, on a horizontal spindle 39, a freely rotatable roller 40 having substantially the form of a barrel, or, for example, as illustrated a middle cylindrical portion flanked by frusto-conical end portions. The axes of said clevis shanks 36 are radial to the cylindrical elements. The arrangement is such that, when the rider is bearing on the aforesaid cylindrical driving elements 2, the four rollers 40 bear, in two spaced transverse pairs, two on each side of the upper arcs of said cylindrical elements. Evidently in such a disposition of the rollers there will be considerable friction between their surfaces, and the rotatably driven cylindrical elements 2.

The clevises 37, 38 have beneath the wing plates each a longitudinal extension arm 41, 42, and the two arms at each end are connected by articulated links 43, parallel to said plates, to upwardly divergent arms of a bell crank lever 44, one of said arms having an extension 45 for the attachment of operating means, whereby the clevises are angularly displaceable in unison. For effecting and controlling said angular displacement, one of said wing plates 35 has at each end a lug 46 in which is mounted one end of the external casing 47 of one of a pair of push-pull control cables, for example of the kind known by the name "Bowdenflex," the internal, displaceable elements 48 of said control cables being extended and articulated each to one of the extension arms 45 of one of said bell crank levers 44.

There also extends laterally from the middle of the wing plate carrying said lugs 46 a spindle 49 on which is secured an upper end eye 50 of a rigid depending tube 51, so bent (as shown in FIG. 2) that immediately below the supporting brackets 11 said tube is brought into the median longitudinal vertical plane of the frame 34. Said tube extends downwardly, and carries at its lower end a saddle 52 and a foot rest bar 53, such that a man can sit facing said tube with one leg on either side of the lower end thereof, and his body and feet supported. The operative ends of said Bowdenflex controls 47, 48 are brought to a pair of lugs 54 on the depending tube 51 wherein the lower ends of the external casings 47 are adjustably anchored, while the inner members 48 are extended downwardly and articulated to opposite ends of a two-armed lever 55, pivoted on a pin 56 mounted radially to the tube 51, with an operating arm 57 extending in a direction, e.g. upwards, such that it can conveniently be displaced by a man seated on the saddle 52.

In the mean position of said control arm 57, for example the vertical position as shown in FIG. 1, the Bowdenflex control cables 47, 48 are so adjusted as to locate the bell crank levers 44 to which their upper ends of elements 48 are articulated so that the clevises 37, 38 support the rollers 40 with their axes parallel to the axis of the cylindrical element 2 upon which at the time said travelling rider 33 is located. The two endwise pairs of rollers are thus located transversely across said cylindrical element, and the rotation of said element merely causes the rollers to rotate idly without applying any longitudinal driving effort to the rider. On the control arm 57 being moved to one side, the lower end of the internal member 48 of one Bowdenflex cable is pulled downwards, and the lower end of the other is pushed upwards, so that said members equiangularly displace the bell crank levers 44 to which their other ends are articulated, thus equally displacing the two pairs of clevises 37, 38 and the rollers 40 carried thereby to oblique positions relative to the axis of the cylindrical element upon which they bear at the time. Thus, assuming the cylindrical element 2 (as seen in FIG. 2, i.e., by a person seated on the saddle and facing forwards in the desired direction of travel) is rotating anti-clockwise, the two pairs of rollers 40 will rotate in a generally clockwise direction and since the part of the lower arc of each roller which first encounters the cylindrical element is obliquely forward of that part of the same roller leaving the cylindrical element, there is applied to the rider 33 as a whole a component of force tending to drive the rider forward upon the cylindrical element 2.

By reason of the spacing of said two pairs of rollers 40 fore and aft at the ends of the rigid longitudinal frame 34, and the suspended tube 51 being beneath the centre of said frame, the rider 33 and the saddle 52 carried thereby are in a stable attitude, and a person seated on the saddle is carried forwards smoothly and rapidly.

When movement in the opposite direction is required, while the cylindrical elements 2 continue to be rotated in the same direction, the saddle can be swung around the suspended tube 51 through 180° so as to face in the opposite direction, and upon the control arm 57 being angularly displaced to the opposite side about its pivot 56 the two pairs of clevises carrying the rollers 40 are turned to the opposite oblique disposition with respect to the cylindrical element 2, whereby in the manner above described the rider 33 is caused to be displaced in said opposite direction along said elements.

Further, by virtue of the longitudinal spacing of the two endwise pairs of rollers 40, and the small length of any gap between any two components of the series of cylindrical elements, the rider is enabled to progress smoothly over said gaps, including the gaps at the supporting brackets, and gaps whereat two adjacent elements of the series are at a mutual angle, which will usually be quite small.

The rider frame 34 has a horizontal plate which joins the spaced-apart upper margins of said oblique wing plates 35. At one end of said horizontal plate there are two lugs 58 carrying a transverse pin 59 which supports a lever 60, the middle of which supports another transverse pin 61 carrying a freely rotatable roller 62. The free end of said lever 60 comprises an abutment 63 which bears upon a resiliently compressible buffer 64 or compression coil spring. Said roller 62 is intended to engage beneath a rail 175 fixed above the series of rotatable cylindrical elements 2, for example, an inverted T-section rail, particularly where the rider 33 is required to ascend or descend upon an inclined cylindrical element. Such engagement of the roller 62 with the rail compresses the buffer or spring 64, the stress in which is added to the suspended load to enhance the frictional grip of the propelling rollers 40 upon the cylindrical elements 2. The rider 33 is thereby enabled to negotiate gradients steeper than 1:3.

Figures 7, 9, 10:
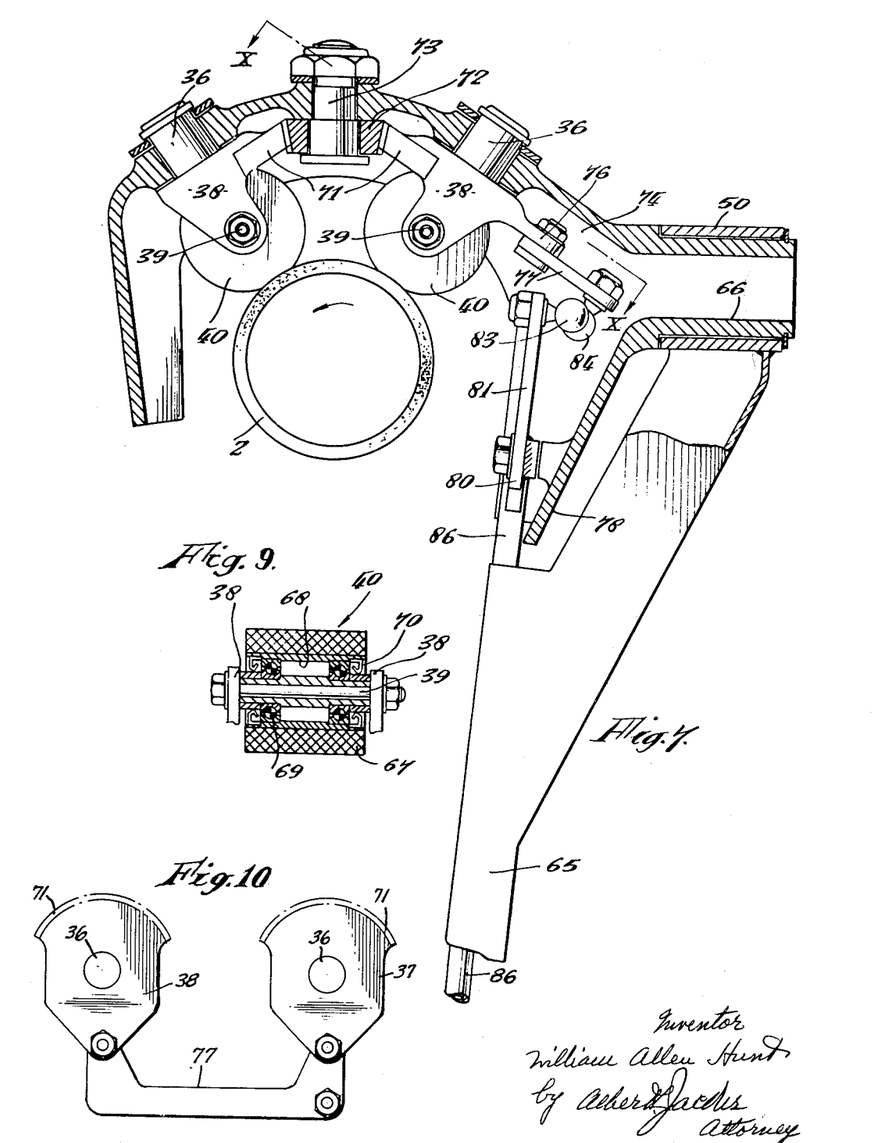
FIG. 9 is a section of a roller.
FIG. 10 is a fragmentary view on the line X—X of FIG. 7.

In the modified apparatus illustrated in FIGS. 5–10, the tube 51 which carries the saddle 52 and foot rest 53 is suspended by an elongated, downward-tapering, hollow member 65, which has at its upper end an eye 50 pivoted on a hollow boss 66 integral with the rider 33. The rollers 40 consist, as shown in FIG. 9, each of a cylindrical sleeve 67 of rubber or equivalent resilient material, with a tubular bush 68 mounted on spindle 39 in the clevis 38 with the aid of ball bearings 69 enclosed by seal rings 70. Each of the four clevises, i.e. the pair 37 and the pair 38, is modified by an integral bevel gear segment 71, and the gear segments of each pair are meshed with a bevel wheel 72, each of the two bevel wheels being mounted for free rotation upon a spindle 73 secured in the upper part of the rider 33 as shown in FIG. 7. Further, within a hollow projection 74 (which extends into said hollow boss 66) at one side of the rider, the clevises 37 and 38 on this side have outwardly directed lugs 75, 76 which are articulated as shown in FIG. 10 to a link 77. Said hollow projection 74 comprises an apron plate 78, and on the inner side of this plate a bell crank lever 79 is mounted on a pin 80. An upstanding arm 81 of said lever is articulated to said link 77 by a rod 82 with ball joints 83, 84. A neutrally horizontal arm 85 of the lever 79 is connected by a control rod 86, which extends downwardly within said hollow member 65, to a neutrally horizontal lever 87 secured to a spindle 88 which is mounted in a lug 89 projecting from the lower end of said member 65. A control lever 90 is secured to said spindle 88 within reach of a man seated on the saddle 52.

In the operation of the embodiment, it may be assumed that the cylindrical element 2 (as seen in FIG. 7, i.e. by a person seated on the saddle 52 and facing forwards in the desired direction of travel) is rotating anti-clockwise. On the control lever 90 being pushed forward, the link 77 is likewise displaced forwardly, and through the operation thereby of the system of bevel gear segments 71 and bevel wheels 72, all four of the rollers 40 are displaced about the radial axes of the clevis shanks 36 to oblique positions, relative to the axes of the element 2, such that the part of the lower arc of each roller which first encounters the element 2 is obliquely forward of that part of the same roller leaving the cylindrical element, and there is applied through the roller mountings to the rider 33 as a unit a component of force tending to drive the rider forward upon the element 2.

When movement in the opposite direction is required, the saddle 57 can be swung around the tube 51 through 180°, and upon the control lever again being pushed forward (i.e. away from the person) the rollers 40 are set in the opposite oblique disposition, and while the element 2 continues to rotate in the same angular sense the rider 33 is caused to be displaced in said opposite direction along the element 2.

Riders as hereinbefore described, more particularly with reference to FIGS. 5-10, may be adapted for the transport of goods, by the provision thereon of a platform or tub, preferably in association with a chair for supporting a person controlling the movement of the leading rider.

Figure 11:
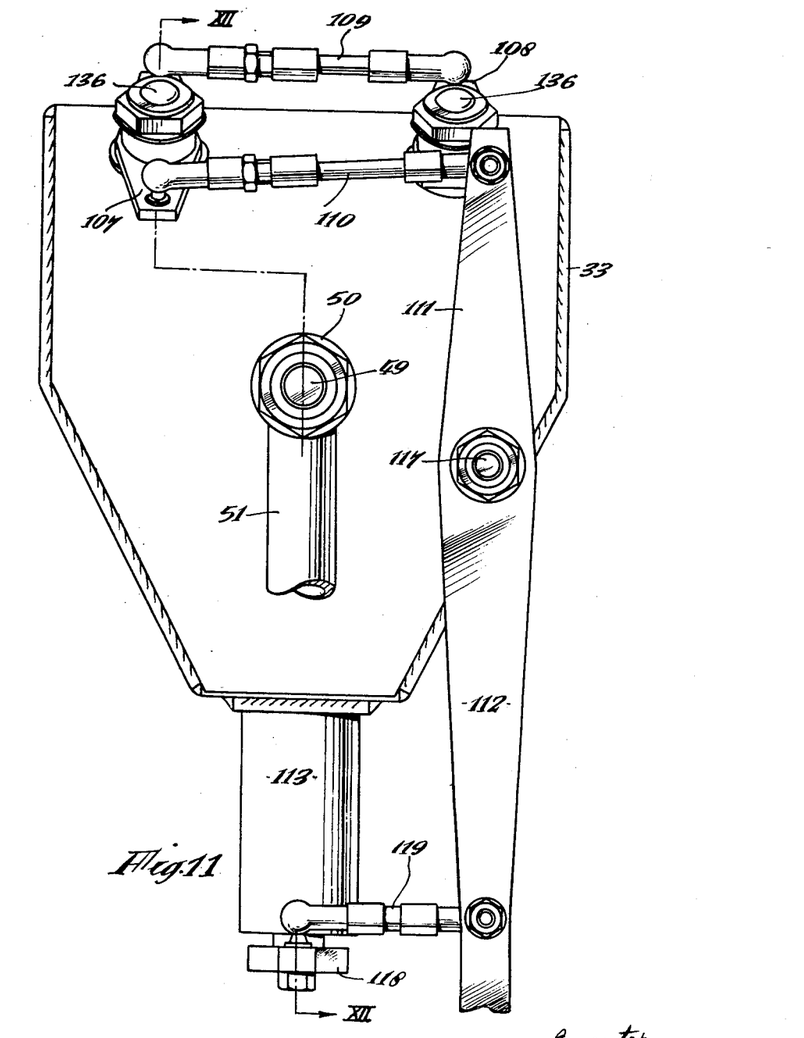
FIG. 11 is a sectional side elevation of a modified rider.
Figure 12:
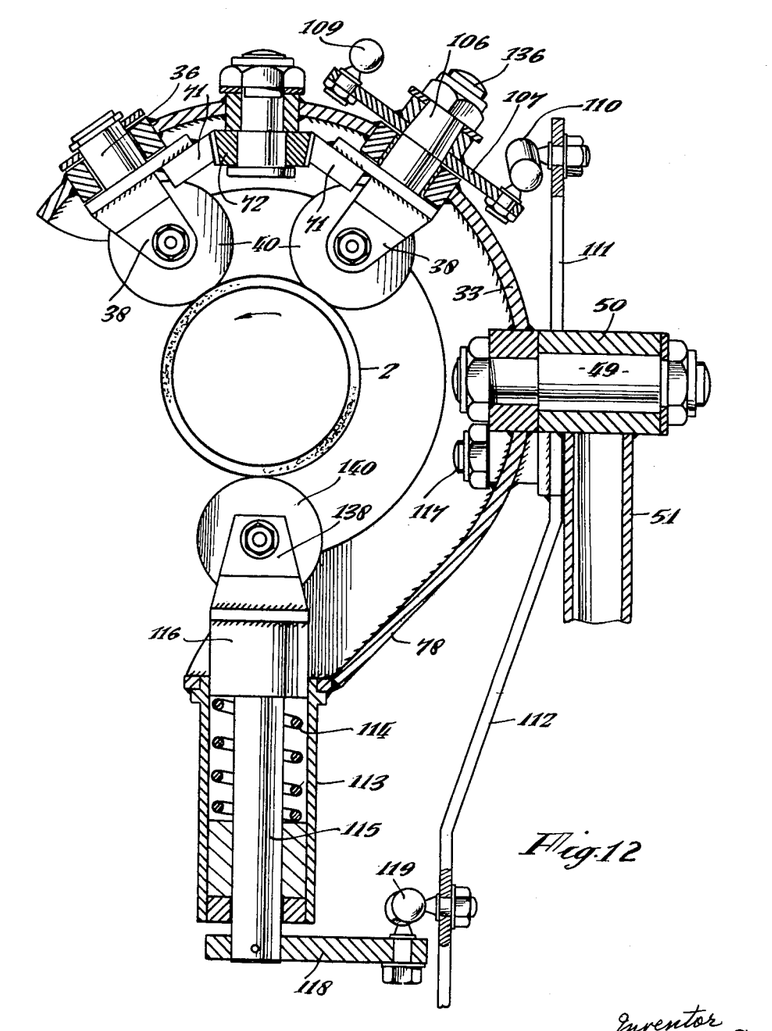
FIG. 12 is a transverse section on the line XII—XII of FIG. 11.

FIGS. 11 and 12 show a rider modified to provide greater adhesion for negotiating steep gradients (in general, gradients steeper than 1 in 3). In this embodiment the clevises 37, 38 on the control side are connected to those on the other side of the cylindrical element 2 by bevel gear segments 71 and wheels 72 as in FIG. 7, but one of the shanks 136 of said clevises on the control side has externally of the rider 33 a taper portion 106 on which is secured a two-armed straight lever 107, while the other shank has likewise secured to it a single-arm lever 108. The lever 108 is connected to one arm of the lever 107 by a ball-jointed follower link 109, while the other arm of said lever 107 is connected by a ball-jointed actuating link 110 to the upper arm 111 of a control lever 112, said control lever extending downwardly to within reach of a man sitting on a saddle which is supported (as in the embodiment of FIGS. 1 and 2) by a suspension tube 51 pivoted by an eye 50 on spindle 49 extending laterally from the rider 33.

The apron plate of said rider is extended downwardly and inwardly, and supports beneath the element 2 a vertical tubular bush 113. In this bush there is mounted upon a shaft 115 a head 116 supporting a clevis carrying a roller 140 which is urged upwards, by a spring 114 surrounding the shaft 115, to bear upon the lower arc of the element 2. The control lever 112 is pivoted on a pin 117 mounted on the rider 33 at level between the levels of the upper end of the arm 111 and the lower end of the bush 113. There is secured to the lower end of the shaft 115 a lever 118 which is connected by a horizontal ball-jointed link 119 to the control lever 112.

In the operation of this arrangement, when the control lever 112 is operated by a person mounted on the saddle supported by the tube 51, for example to displace the arm 111 to the right, this causes the roller shanks 136 to turn anti-clockwise equally through the links 110 and 109, and the roller shanks 36 to turn equally anti-clockwise through the gear segments 71 and gear wheels 72 (so that as seen in FIG. 14 all the rollers 40 have their rear or visible ends displaced to the right and their forward ends displaced to the left). The link 119 is at the same time turned to the left so that through the lever 118 and shaft 115 the lower roller 140 is turned in the opposite sense and through an equal angle (that is, with its rear or visible end displaced to the left and its forward end displaced to the right). Thus all five rollers are simultaneously displaced so as to receive equal forces from the rotating element 2, tending to drive them in the same axial direction. For the purpose of increasing the driving effect when the rider is to be propelled up a steep gradient, the upper rollers 40 and the lower roller 140 may be caused to bear more strongly by providing cylindrical elements 2 of greater diameter over the length of the gradient, for example with the aid of tapered connecting elements such as 31 shown in FIG. 3. In this manner the spring 114 supporting the lower roller 140 is compressed, and exerts directly upon the roller 140, and indirectly through the rider frame upon the set of upper rollers 40, an increased force which causes them to grip more strongly the rotating element 2.

Other uses and additional modifications will be appreciated by those skilled in the art with reference to the aforesetforth disclosure and the appended claims. The foregoing is in no way limitative but merely illustrative of the present invention.

What I claim and desire to secure by Letters Patent is:

1. Transporter means comprising a continuous series of rotatable cylindrical elements connected together by universal joints, drive means for rotating said series of elements, disposed at spaced intervals, a travelling rider comprising at least two spaced sets of freely rotatable bearing means mounted so that each set bears upon the upper arcs of said cylindrical elements, said bearing means pivotally mounted for turning about axes radial to the axis of said cylindrical elements and linkage means connecting said bearing means together in parallel disposition so as to be angularly displaceable between attitudes wherein the axes of said rotatable bearing means are oblique to the cylindrical element on which the rotatable means bear, when a longitudinal driving effort is transmitted to the rider by friction between the cylindrical element and said rotatable bearing means, and attitudes wherein the axes of said rotatable bearing means are parallel to that of the cylindrical element, when no driving effort is transmitted, and wherein said rider has a laterally extending boss, a rigid depending member pivotally supported on said boss, load carrying means mounted at the lower part of said depending member, and actuating control means for said linkage means mounted on said depending member.

2. Transporter means according to claim 1, wherein said travelling rider has a frame comprising two oblique wing members adapted to extend symmetrically over said cylindrical elements, at least four clevis members angularly displaceable about shanks mounted two in each of said wing members and in two transverse pairs and four rollers freely rotatable one in each of said clevis members, the axes of said shanks diverging upwardly so that the rollers in two longitudinally spaced pairs bear on opposite sides of the upper arcs of said cylindrical elements, and means interconnecting said shanks so that the rollers are jointly displaceable between attitudes oblique to the cylindrical element on which they bear and attitudes parallel to said element.

3. Transporter means according to claim 2, wherein each of the clevises has a longitudinal extension arm, the two arms on each transverse pair of clevises are articulated by links to upwardly divergent arms of one of two bell crank levers, and said bell crank levers are interconnected by actuating control means for equal and opposite angular displacement, whereby the four rollers are equiangularly displaceable in the same angular direction.

4. Transporter means according to claim 4, wherein each of said clevises has an integral bevel gear segment, the segments of each transverse pair of clevises are meshed with a freely rotatable bevel gear, the two clevises mounted in one of said wing members have arms interconnected by a link, and actuating control means are connected to one of said arms or to said link, whereby on operation of the control means the four rollers are equiangularly displaced in the same angular direction.

5. Transporter means according to claim 4, wherein the rider has on one side a depending apron plate, a bell crank lever is mounted on said apron plate, one of the arms of said lever is articulated to said link, and the other arm of said lever is articulated to the upper end of a vertically displaceable rod, and the lower end of said rod is articulated to a pivoted control lever.

6. Transporter means according to claim 1, wherein the rider has on one side a depending apron plate, a vertical bush mounted on a downward extension of said apron plate supports a shaft carrying a clevis in which a roller is freely rotatable, said clevis being urged upwards by a spring to bear on the lower arcs of said cylindrical rotating elements, an arm is secured to said shaft below said bush and connected to a downwardly extending arm of a control lever pivoted at a higher level on said apron plate, and an upwardly extending arm of said control lever is articulated to said linkage means for actuating said roller means bearing on the upper arcs of said cylindrical elements.

7. Transported means according to claim 1, wherein a seat and footrest are mounted at the lower part of said depending member, and the said control means is located within reach of a person occupying the seat.

8. Transporter means according to claim 7, wherein said depending member is a tube so formed that immediately below said cylindrical elements said tube is brought into and extends downwardly in the vertical radial plane of said cylindrical elements.

9. Transporter means according to claim 7, wherein said depending member comprises an elongated hollow member inclined to locate its lower end in the vertical radial plane of said cylindrical elements, and a member which extends downwards from said hollow member and carries said seat and footrest.

10. Transporter means according to claim 1, wherein said series of rotatable elements comprises a plurality of lengths of rigid tubing, an element of a universal joint located in each end of each length of tubing, and a cooperating element of said joint located in a pulley-like member juxtaposed to each of said ends, said pulley-like members being mounted in pairs, one on each side of a C-form bracket, on a spindle supported in the lower and upwardly directed end portion of said bracket, so as to maintain continuous the upper arcs of the elements at the supported and driving location.

11. Transporter means according to claim 10, wherein at suitably spaced supporting brackets at least one of the pair of pulley-like members is rotatably driven by an endless belt from an electric motor mounted on the bracket, said belt being guided by idler pulleys located so that both runs of the belt moving towards and away from said driven member are located below the horizontal diameter of said member.

12. Transporter means according to claim 1, further comprising a rail fixed above and parallel to said rotatable cylindrical elements, a lever mounted upon said travelling rider, a roller carried by said lever and freely rotatable on a transverse axis, and a resiliently compressible buffer serving to urge said lever and roller upwardly to cause said roller to bear beneath said rail.

13. Transporter means according to claim 5, wherein said actuating control means comprise two push-pull cables, an internal displacing element of each of said cables being connected at one end with one of said bell crank levers, a two-armed control lever is mounted on said depending member, and an external casing of each of said cables has one end located on the rider frame and its other end located on said depending member adjacent one arm of said control lever.

References Cited in the file of this patent

UNITED STATES PATENTS

| | | |
|---|---|---|
| 402,933 | Judson | May 7, 1889 |
| 423,872 | Judson | Mar. 18, 1890 |

UNITED STATES PATENT OFFICE
CERTIFICATE OF CORRECTION

Patent No. 3,164,104                           January 5, 1965

William Allen Hunt

It is hereby certified that error appears in the above numbered patent requiring correction and that the said Letters Patent should read as corrected below.

In the grant, lines 2 to 4, for "assignor to Joseph Cook, Sons & Company (1930) Limited, of Washington, England, a company of Great Britain and Northern Ireland," read -- assignor of one-half to Joseph Cook, Sons & Company (1930) Limited, of Washington England, a company of Great Britain and Northern Ireland, --; line 13, for "Joseph Cook, Sons & Company (1930) Limited, its successors" read -- William Allen Hunt, his heirs or assigns and Joseph Cook, Sons & Company (1930) Limited, its successors --; in the heading to the printed specification, lines 3 to 6, for "assignor to Joseph Cook, Sons & Company (1930) Limited, Washington, England, a company of Great Britain and Northern Ireland" read -- assignor of one-half to Joseph Cook, Sons & Company (1930) Limited, Washington, England, a company of Great Britain and Northern Ireland --.

Signed and sealed this 27th day of July 1965.

(SEAL)
Attest:

ERNEST W. SWIDER
Attesting Officer

EDWARD J. BRENNER
Commissioner of Patents